Patented June 17, 1930

1,763,937

UNITED STATES PATENT OFFICE

HARRY J. STIEVATER, OF BUFFALO, NEW YORK

EXTENDER FOR PAINTS, ETC.

No Drawing.      Application filed July 12, 1927.  Serial No. 205,271.

This invention relates to improvements in paint, enamels, under coatings, primers, surfacers, lacquers, glazing putties, spot putties, and liquid and paste fillers.

The primary object of this invention is the provision of an economical extender, namely slag, for use in the manufacture of paints and a wide variety of surface applying and treating liquids and pastes.

In the paint industry it is customary to use extenders and fillers such as calcite, whiting, Paris white, china clay, catalpo, asbestine, silex, plaster of Paris, gypsum, talc, magnesium carbonate, soapstone, and various other natural and artificial minerals and compounds. While many of these are satisfactory for the purpose used, I have found that slag, produced as a residue product from iron and steel manufacture may be successfully used as an extender, so that the same will equally as well or better function than any of the well known extenders, and at a considerably lower cost.

The slag used as an extender may be produced in the blast furnace, open hearth, or electrical furnace process of iron or steel manufacture. I have used slags with success in various lead, zinc, lithopone and titanium oxide paints and enamels, in primers, spot and glazing putties, and paste and liquid fillers, etc. as an extender, and it has been found that the slag works equally as well and even better than ordinary or conventional extenders in paints, which the slag replaces, and with far greater economy.

The slag preferably to be used is produced in the blast furnace process of iron or steel manufacture, and I have found that a slag produced in this manner which may be used with great success as an extender has the following chemical analysis:

|  | Per cent |
|---|---|
| Silex, silica, or silicon dioxide ($SiO_2$) | 35.68 |
| Lime or calcium oxide (CaO) | 42.57 |
| Alumina ($Al_2O_3$) | 12.60 |
| Magnesium oxide (MgO) | 6.53 |
| Iron oxide (FeO) | .44 |
| Manganese oxide (MnO) | .84 |
| Sulphur (S) | 1.82 |

It is apparent from the above chemical analysis that slag is essentially a combination of lime and silica in relative proportions which renders the same desirable for use as an extender. It is of course old prior to this invention, to use silex and calcium carbonate as extenders, and upon analyzing the slag in the above manner it is apparent why slag makes a good extender, since it combines the advantages of both conventional extenders and being slightly basic due to excess of lime over silica, the slag is really the ideal extender for primers and surfaces used upon steel or iron surfaces, such as automobile bodies. Its slightly basic reaction neutralizes oil and resin acids found in varnishes and oils, and thus prevents these from reacting with metallic surfaces and thus prevents corrosion and rusting.

The high temperature of the blast furnace of course cause the lime and silica to react to form various lime-silicates, and these lime-silicates are very hard and constitute the main reason that primers and surfacers using a slag extender sand so well and hold out succeeding coats of enamel, varnish, etc. so well.

The composition of slags throughout different parts of the world vary considerably, and it is within the range of this invention to use slag as an extender, including a silica content varying from 28% to 37%, more or less; lime ranging from 32% to 49% more or less; alumina ranging from 8% to 15% more or less, and magnesium oxide ranging from 6% to 20% more or less. These variations in proportion of course depend upon the initial ore used; the temperature of the furnace; and the amount and kind of flux used, but these variations will not affect suitability of slag as an extender, since the slag is mainly composed of lime and silica, both in themselves excellent extenders, and the percentage ratio between the same while fairly constant does not affect the usefulness of the slag as an extender.

I consider slag produced from open hearth furnaces suitable for use as an extender, and one typical open hearth slag which may be used contains the following analysis:

| | |
|---|---|
| $CaO$ | 48 % |
| $SiO_2$ | 15.58% |
| $FeO$ | 11.1 % |
| $MnO$ | 9.93% |
| $MgO$ | 6.02% |
| $P_2O_5$ | 3.67% |
| $Fe_2O_3$ | 1.89% |
| $S$ | .16% |

A typical electrical furnace slag suitable for use as an extender may have the following analysis:

| | |
|---|---|
| $SiO_2$ | 20% |
| $CaO+MgO$ | 70% |
| $CaC_2$ | .3 to 1% |
| $Fe$ | 1% |

The slags produced as a residue from iron and steel manufacture are known to be weather and wear resistant, and therefore are very desirable as used for an extender in connection with manufacture of paint fillers and coatings for the paint industry.

The slag is prepared for use as an extender by first crushing the same to the desired fineness, preferably so that the same may pass thru a 45 to 325+ mesh screen. This is accomplished by running the slag thru a ball mill. The pulverization of the slag will of course vary according to the type of product in which the slag as an extender is to be used. For example, slag for use in a paste filler need not be as fine as slag adaptable for use in an enamel. If found desirable the slag may be washed and particles of free iron may be magnetically removed by passing the pulverized slag, in a distributed state over a suitable electro-magnet, or the iron may be suitably removed in any other manner found practical. For most products, however, it is to be understood that the slag may be used just as it comes from the furnace and after pulverization, without removal of constituents. The removal of the free iron is desirable when the slag is used as an extender or filler where the applied coating of the product must be sanded. Sanding of the product containing the slag as an extender will generally pull out the iron particles, and leave small holes in the surface. The iron in going thru the rolls of the mill will flatten out, generally in the form of a thin uneven sheet on the rolls, and this may be suitably removed by electro-magnets. From this discussion of the removal of the free iron the impression is not to be gained that an inferior grade of paint is made up if the iron is not removed. The contrary is true, as I have produced some very fine paints using the slag just as it comes from the mill after pulverization or grinding.

Slag which I have used as an extender, produced as the residue from blast furnace operation contains the following properties, in connection with use as an extender.

Sieve test

The slag under sieve test after grinding shows that 86.88% of the contents pass thru a 325 mesh sieve to render the slag suitable for use as an extender, and is as fine as most any extender used, and in some cases much finer.

Oil absorption

In the comparative absorption tests between slag after pulverization and other conventional extenders, the slag and other extenders with which it is compared when mixed with raw linseed oil until a stiff paste of the same consistency in each case is formed, found to be as follows:—

| | Cubic centimeters oil per 20 grams |
|---|---|
| Slag | 3.2 |
| Calcite | 3.78 |
| Lithopone | 4.32 |
| Zinc oxide | 4.30 |
| White lead | 2.16 |
| Asbestine | 3.89 |
| Silex | 5.5 |
| Talc | 5.45 |
| Keystone filler | 4.87 |
| Catalpo | 10.8 |
| Metronite | 2.9 |
| Magnesium carbonate | 51.3 |
| Soapstone | 8.1 |

Color

The slag has a light gray color which is to some extent objectionable where a white paint or material is desirable, such as a white wall paint. Since, however, the great majority of paint materials have some color, this is not a serious objection. The gray cast in the extender is caused by traces of carbon from the coke used in the blast furnace, but in actual tests I have found that white paint produced with slag as an extender compares well with conventional white paint, in color, and the difference in color is only detected after a minute examination.

Bulking

Slag in comparison to other conventional extenders is possessed of the specific gravity, weight, and bulking shown in the following comparative table:

| Material | Specific gravity | Weight per solid gallon (pounds per gallon) | Bulking (gallon per pound) |
|---|---|---|---|
| Slag | 3.07 | 25.6 | .040 |
| Zinc oxide | 5.32 | 44.32 | .022 |
| Lithopone | 4.30 | 35.82 | .027 |
| Calcite | 2.71 | 22.57 | .0443 |
| White lead | 6.29 | 53.23 | .0187 |
| Asbestine | 2.85 | 23.74 | .042 |
| Silica | 2.65 | 22.07 | .045 |
| Talc | 2.84 | 23.66 | .0422 |
| Keystone filler | 2.71 | 22.57 | .044 |
| Catalpo | 2.80 | 23.32 | .0428 |
| Metronite | 2.94 | 24.49 | .0408 |

While I do not wish to be limited to the use of the slag extender in any specific relation of other ingredients and proportions, yet herewith it is thought desirable to list a number of formulas in which I have used slag as an extender, and give the comparative results with formulas similar in all respects, but using a different extender than slag.

In the provision of a baking under coating I have provided a composition of the following ingredients and proportions:—

| | |
|---|---|
| Lithopone | 1800 lbs. |
| Slag | 500 lbs. |
| 4 lbs. per gal. China wood oil-ester gum varnish | 120 gal. |
| Mineral spirits | 58 gal. |
| Bodied linseed oil | 10 gal. |

In an under coating made from the above formula using slag, and an identically similar formula except that the slag is replaced by conventional whiting of 500 lbs. I have found that the baking under coatings after reduction in the proportion of 4 to 1 with mineral spirits, and sprayed on steel panels and baked two hours at 160° F. the formula using the slag as an extender bodied up the same as the formula using whiting as an extender, and both the formula with the whiting as an extender and the one using slag as an extender baked with about the same hardness and wet sanded with about the same ease. It was noticed, however, that the panel finished with the under coating using slag as an extender held out both a varnish and an enamel better than the panel finished with the formula using conventional whiting as an extender. The conventional whiting used was calcite.

In a paste filler (dark) I have used slag in the following formula:

| | |
|---|---|
| Slag | 75 lbs. |
| Raw linseed oil | 1¼ gal. |
| Japan drier | ¾ gal. |
| Mineral spirits | ⅜ gal. |
| Gloss oil varnish | 8/16 gal. |
| Burnt umber (ground in oil) | 5¼ lbs. |
| Solution for bodying | 6 ounces |
| Maroon pigment in oil | 5¼ lbs. |
| Drop black in Perilla oil | 2 lbs. |

In a formula containing substantially the same ingredients except that the slag is replaced by silica in amount of 75 lbs. it was found in comparing the formula using the conventional filler with the slag filler, that the paste fillers held out varnish equally as well, and filled the pores of the wood in about the same relation of efficiency, so that it was proven that slag acts just as good in a filler as silex or silica.

In the provision of a red gear enamel I have used the following formula:

| | |
|---|---|
| Red pigment ground in bodied Perilla oil | 3¼ lbs. |
| Vivatone toner ground in bodied Perilla oil | 2 lbs. |
| Lithopone ground in bodied Perilla oil | 3¼ lbs. |
| Slag ground in boiled Perilla oil | 2 lbs. |
| 4 lbs. per gal. China wood oil-rosin-ester gum varnish | 1¾ gal. |
| Cobalt resinate drier | 2¾ oz. |

In the above formula it was found that the enamel containing slag as an extender drys as hard as a similar formula identical in all respects but using catalpo ground in bodied Perilla oil in amount of 2 lbs. as an extender, and that in both cases the luster was the same, and the flow and brushing efficiency was equal in the formulas.

I have provided and used a blue automobile surfacer consisting of the following:—

| | |
|---|---|
| Lampblack | 4 lbs. |
| Slag | 328 lbs. |
| Ultramarine blue | 32 lbs. |
| 2.66 lbs. per gal. China wood oil varnish | 30 gal. |
| Gloss oil varnish | 2 gal. |
| Cobalt resinate drier | 1 gal. |

In comparison with the above using slag as an extender I have also used a conventional formula similar in all respects to the above except that the slag is replaced by the three following ingredients and their respective proportions:—

| | Pounds |
|---|---|
| Talc | 128 |
| Metronite | 192 |
| Soapstone | 8 |

In the use of the above blue automobile surfacers using the slag in one case and the three ingredients immediately above given in the other case as extenders, it was found, after grinding on a roller mill and spraying subsequent to reducing in the proportion of 4 to 1 with mineral spirits, over a red primer on a steel panel, that the surfacer using slag dries as hard and flows out as well and receives enamel as well as the formula using the three conventional extenders. Unless the iron particles are removed from the slag, however, the surfacer using the slag will not wet sand as well as the formula using the conventional extenders, but such free iron may be removed by magnets, as above pointed out.

In some formulas the slag is used in paste form, while in others it is added to the liquids in the dry state and then the resultant paste is ground and thoroughly intermixed by running thru a suitable grinder, such as a roller mill or stone mill or pebble mill.

The mineral spirits mentioned in the formulas is of course known as substitute for turpentine, which it may replace, or turpentine may be used. The substitute or mineral spirits is generally that fraction found in the manufacture of hydrocarbon products which comes over between the gasoline and kerosene fractions.

It is of course understood that the slag prior to manufacture of the paint, filler, surfacer, or the like, is in a dry pulverized condition which may pass thru a 50 to 325+ mesh, according to the use of the product being made.

From the foregoing it is apparent that slag as an extender or filler is novel as used in the paint industry and may be successfully used, with far greater economy than conventional extenders or fillers, and in many instances with increased efficiency.

I do not of course desire to limit myself to the exact procedure mentioned in any of the above formulas, but believe that the essential novelty in the production of paints, enamels, under coatings, primers, surfacers, putties, fillers, and the like resides in the use of slag produced as residue from iron and steel manufacture as a filler or extender, with great economy. In the various formulas used the ingredients may vary widely, and the slag ingredient may be used in various proportions, and the slag used may vary considerably in composition and proportions of ingredients, without departing from the spirit of the invention or the scope of the claims.

I claim:

1. An extender or filler of the class described consisting of slag produced as a by-product from the manufacture of iron or steel in which the slag, as such, contains silica and lime as its two major constituents.

2. As an article of manufacture on extender for use in the manufacture of paint, enamels, lacquers, under coatings, primers, surfacers, putties, and fillers, consisting of pulverized slag including silica, lime, aluminum and magnesium oxide, in which the silica and the lime are the two major constituents.

3. An extender for use in the paint industry consisting of pulverized slag produced as a by-product from iron or steel manufacture mixed to a paste consistency with linseed oil.

4. An extender for use in the paint industry consisting of silica ranging from 28% to 37% lime ranging from 32% to 49%, alumina ranging from 8% to 15%, magnesium oxide ranging from 6% to 22%, with traces of manganese and sulphur.

5. An extender and filler of the class described consisting of pulverized slag as a by-product from the manufacture of iron and steel having the free iron removed.

6. The process of producing an extender and filler which consists in grinding slag to substantially a pulverized condition, and treating the pulverized slag magnetically for the removal of free iron therefrom as an undesirable constituent.

7. The process of producing a filler and extender which consists in pulverizing slag produced as a by-product of iron and steel manufacture so that the same will pass thru a fine mesh sieve ranging from #50 to #325+ mesh, and traversing the pulverized slag with an electro-magnet for removal of free iron therefrom.

8. As an article of manufacture an extender for use in paints and the like consisting of finely pulverized slag obtained as a by-product of iron or steel manufacture, and consisting of silica and lime as its two major ingredients containing a percentage greater than the total percentage of all other constituents, said pulverized slag including as minor constituents smaller percentages of alumina and magnesium oxide, with all free iron removed.

9. A surfacing paint including pulverized slag produced as a by-product of iron and steel manufacture, pigment, China wood oil varnish, gloss oil varnish, and a drier.

HARRY J. STIEVATER.